Sept. 18, 1956     J. ROZMUSKI     2,763,179
ROTARY SHUTTER FOR MOTION PICTURE PROJECTOR
Filed May 14, 1953     2 Sheets-Sheet 2

INVENTOR
Joseph Rozmuski.

BY Emory L. Groff

ATTORNEY.

United States Patent Office 2,763,179
Patented Sept. 18, 1956

2,763,179

ROTARY SHUTTER FOR MOTION PICTURE PROJECTOR

Joseph Rozmuski, Yverdon, Switzerland, assignor to Paillard S. A., Sainte-Croix, Switzerland, a company of Switzerland Application May 14, 1953, Serial No. 355,067

Claims priority, application Switzerland December 6, 1952

3 Claims. (Cl. 88—19.3)

It is well known that, in addition to its principal function of interrupting the light beam during the period of the film's downward movement, the shutter of a motion picture projector must permit a certain number of supplementary occultations during the projection of each frame so as to prevent flicker. Experience has shown that in order to achieve good-quality projection, free from annoying flicker, the number of occultations should not be less than 48 per second. This makes it possible to determine the number of occultations per frame necessary for a certain film projection rate. Thus, for a rate of 24 frames per second, a shutter which completes one revolution per frame must have two blades, whereas for a rate of 16 frames per second, it should have three blades. Moreover, to obtain certain effects, it is very advantageous to be able to slow down the projection rate, and, consequently, to increase the number of occultations. Thus, for a rate of 12 frames per second, the shutter should comprise four blades.

The perception of flicker, moreover, depends on the lighting of the screen and is proportional thereto. In certain cases, depending on the projection conditions, this lighting varies, with the result that, to obtain good-quality projection, it is necessary to be able to vary the frequency of occultation for the same projection rate. Thus, by means of a shutter permitting two, three or four occultations per frame it is possible to obtain good-quality projection under any conditions.

The present invention has for its object the provision of means to meet the aforementioned requirements. It relates to a rotary shutter for motion-picture projectors comprising four blades, one of which, intended to interrupt the light beam during the advance of the film in the projection gate, is driven in synchronism with the film's intermittent driving mechanism. This shutter differs from the known shutters by the fact that the other three blades are adapted to be displaced relative to the first one in such a way as to occupy three given positions each for the purpose of obtaining at will two, three or four occultations for each rotation of the shutter under the action of manual control means. This change can take place either while the projector is in operation or while it is at rest.

The accompanying drawing shows diagrammatically and by way of example one form of construction of the shutter in accordance with the invention.

Figures 1, 2 and 3 are front views of the shutter with two, three and four blades, respectively, in operating position.

Figure 1:
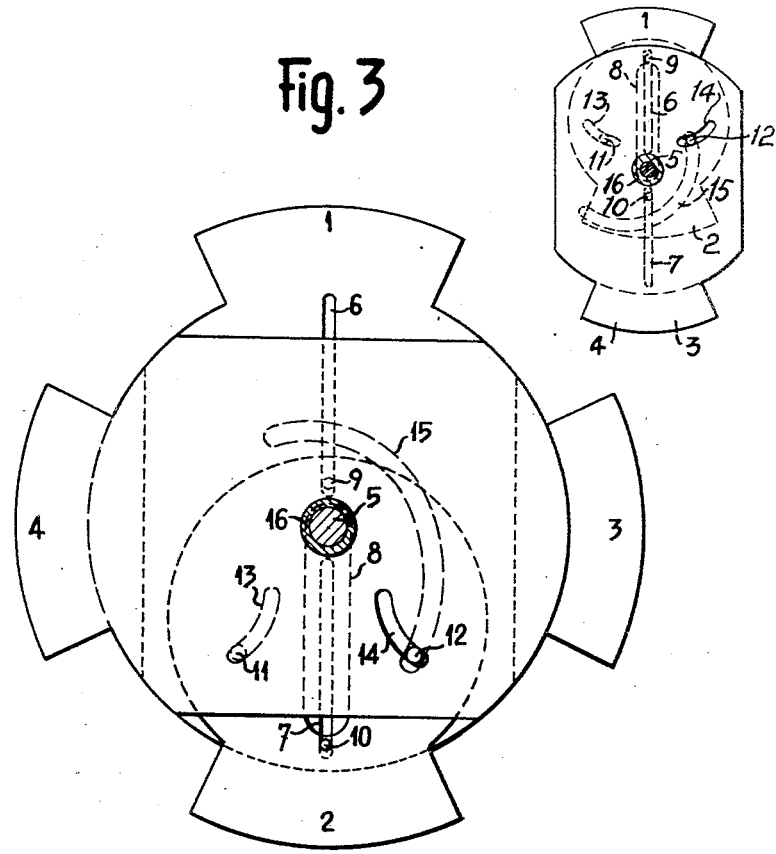

The shutter comprises four blades 1, 2, 3 and 4 and a drive shaft 5. Blade 1 is rigidly secured to shaft 5, whereas blades 3 and 4 are adapted to rotate about the shaft. Blade 2 is diametrically opposite blade 1 and adapted to move perpendicularly relative to the axis of shaft 5. To that effect, blade 2 is provided with an elongated opening or slot 8 permitting transverse movement on shaft 5, and two studs 9 and 10 intended to cooperate with two slots 6 and 7 in blade 1. Slots 6 and 7 and elongated opening 8 have the same longitudinal axis so that blade 2 can move relative to blade 1 along that axis, but not angularly.

Figure 2:
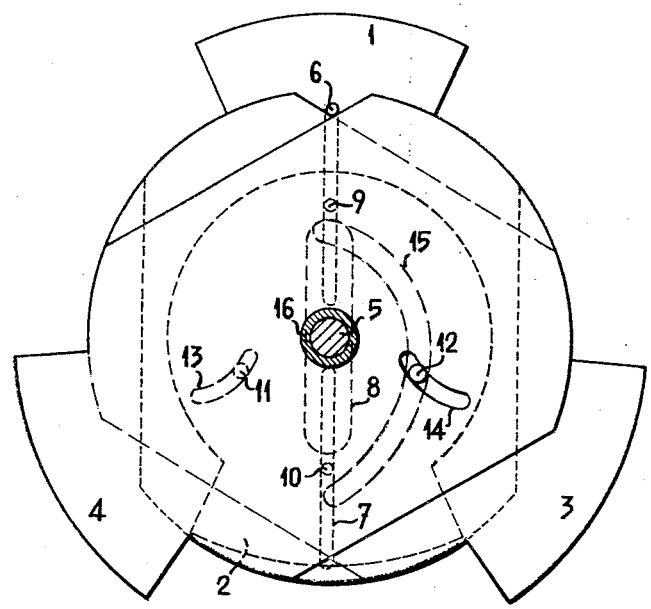
Figure 4:
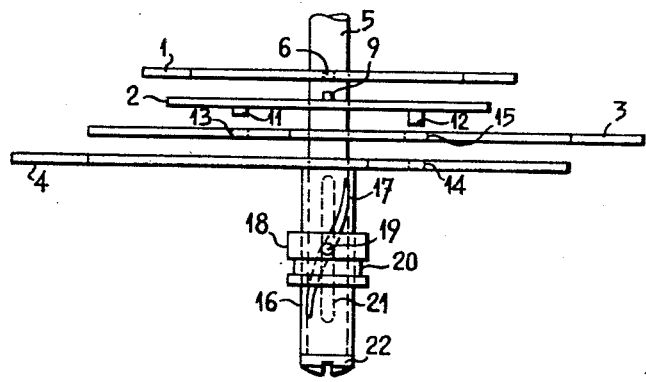
Figure 4 is a top plan view of the shutter, the blades being in position shown in Fig. 2, but mutually spaced apart for greater clarity of the illustration.

On the face opposite the one provided with studs 9 and 10, blade 2 carries two studs 11 and 12. Stud 11 cooperates with a slot 13 of blade 3, whereas stud 12 extends through a curved opening 15 of blade 3 to cooperate with a slot 14 in blade 4. In Figure 4, studs 9, 11 and 12 are not engaged in slots 6, 13 and 14, respectively, because the blades have been spaced apart to facilitate interpretation of the drawing. But it is, of course, obvious that in reality the blades are disposed one against the other so that the ends of the studs engage their corresponding slots. The configuration and position of slots 13 and 14 of blades 3 and 4, respectively, are such that when blade 2 is displaced parallel to slots 6 and 7 of blade 1, the displacement of studs 11 and 12 in their respective slots 13, 14 causes blades 3 and 4 to turn on shaft 5 by the same angle, but in opposite direction. Thus, the positions of the two blades 3 and 4 will always be symmetrical relative to the median plane of blade 1 passing through the axis of shaft 5. As shown in Figs. 1 to 3, blade 2 is in operating position when blades 3 and 4 form an angle of 90° each with blade 1; however, it is concealed by radial displacement on blade 1 when blades 3 and 4 form an angle of 120° each with blade 1.

Blade 4 is secured to the end of a sleeve 16 adapted to rotate on shaft 5 and the sleeve is provided with a helical slot 17. A collar 18 slides on sleeve 16 and supports a pin 19 extending through slot 17. One end of pin 19 is engaged in a longitudinal groove 21 of shaft 5 so as to prevent any angular displacement between collar 18 and shaft 5. Collar 18 has a neck 20 adapted to cooperate with a control element (not shown) for the purpose of varying its axial position. Through the medium of pin 19 and slot 17, any axial displacement of collar 18 causes an angular displacement of sleeve 16 relative to shaft 5; in other words, an angular displacement between blades 4 and 1. This rotation of blade 4 relative to blade 1 in turn causes a radial displacement of blade 2, owing to stud 12 of blade 2 which is engaged in slot 14 of blade 4. If blade 4 turns counterclockwise relative to blade 1 (Fig. 3), the cooperation between stud 12 and slot 14 causes a displacement of blade 2 toward blade 1. In the course of this displacement, stud 11 of blade 2 covers a distance identical to that of stud 12 and, through cooperation with slot 13 of blade 3, causes an angular displacement of the latter which is equal, but in opposite direction, to that of blade 4.

When blade 4 is set at 120° relative to blade 1, blade 3 occupies a symmetrical position and blade 2 is sufficiently displaced in the direction of blade 1 to be completely concealed. The shutter which in Fig. 3 comprised four right-angle blades has thus been transformed into a shutter with three 120° blades (Fig. 2).

If the angle between blade 4 and blade 1 is further increased, blade 2 will continue to be displaced radially toward blade 1 until blades 3 and 4 become superimposed on the opposite side of blade 1, as shown in Fig. 1. The shutter has now but two diametrically opposite blades.

As will be seen, by a simple displacement of collar 18, it is possible to select at will the number of occultations per frame, a great advantage consisting in that this can be done either while the projector is in operation or while it is not in operation.

It is, of course, understood that numerous modifications could be applied to the above described shutter. For instance, the studs and slots provided for mutually connecting the blades could be replaced by other connecting elements, such as articulated rods. Control of the various positions of the shutter blades could also be effected by acting on blade 2 so as to displace it radially relative to blade 1.

The shutter driving mechanism could also be connected to sleeve 16 instead of acting on shaft 5. The latter would then become a loose shaft, and the shutter would be driven in rotation through the intermediary of sleeve 16. Blade 4 would then become the fixed blade adapted to interrupt the light beam during the film's advance.

By way of variation, when the shutter is driven by shaft 5, blade 3 could be rigidly secured to that shaft so as to constitute the fixed blade. Blade 1 would then have to be angularly movable relative to shaft 5.

It is obvious that any known means could be provided to change the respective angular position of shaft 5 and sleeve 16. An arrangement comprising gears could be provided for the purpose, for example. When the angular displacement between sleeve 16 and shaft 5 is effected by axial displacement of a pin 19, as shown in the embodiment illustrated by the drawing, it is well understood that the helical slot could be provided on the shaft, while sleeve 16 would then have a rectilinear groove or likewise a helical slot.

I claim:

1. A rotary shutter for a motion picture projector comprising, in combination, a shaft, a first blade rigidly secured to said shaft, a sleeve rotatably mounted on said shaft, a second blade fixedly connected to said sleeve for rotation therewith, a third blade rotatably mounted on said shaft, said third blade being positioned between said first and second blades, a fourth blade movably mounted on said shaft and radially displaceable on said shaft along a plane perpendicular to the vertical axis of said shaft, said fourth blade being diametrically opposite to said first blade and being positioned between said first blade and said third blade, manual control means for rotating said sleeve relative to said shaft, said control means being positioned about said sleeve and operatively connected thereto, and means for simultaneously displacing said fourth blade radially and said third blade angularly relative to said shaft when said shaft and said sleeve are rotated relative to each other, said means being operatively associated with each of said blades and with said manual control means, whereby the second, third, and fourth blades are displaced relative to the first blade in such a way as to occupy three given positions with respect to the first blade each for the purpose of obtaining, as desired, two, three or four occulations for each rotation of the shutter under the action of said manual control means, either while the projection is in operation or while it is at rest.

2. A rotary shutter for a motion picture projector comprising, in combination, a shaft, a first blade rigidly secured to said shaft, a sleeve rotatably mounted on said shaft, said shaft having a groove on the surface thereof, said sleeve having a slot therethrough positioned facing said groove and in angular relation thereto, a second blade fixedly connected to said sleeve for rotation therewith, a third blade rotatably mounted on said shaft, said third blade being positioned between said first and second blades, a fourth blade movably mounted on said shaft and radially displaceable on said shaft along a plane perpendicular to the vertical axis of said shaft, said fourth blade being diametrically opposite to said first blade and being positioned between said first blade and said third blade, manual control means for rotating said sleeve relative to said shaft, said control means being positioned about said sleeve and operatively connected thereto, said control means including an axially movable collar having a pin connected thereto, said pin projecting through said slot in said sleeve and slidably engaging said groove in said shaft, and means for simultaneously displacing said fourth blade radially and said third blade angularly relative to said shaft when said shaft and said sleeve are rotated relative to each other, said means being operatively associated with each of said blades and with said manual control means, whereby the second, third, and fourth blades are displaced relative to the first blade in such a way as to occupy three given positions with respect to the first blade each for the purpose of obtaining, as desired, two, three or four occultations for each rotation of the shutter under the action of said manual control means, either while the projector is in operation or while it is at rest.

3. A rotary shutter for a motion picture projector comprising, in combination, a shaft, a first blade rigidly secured to said shaft, said first blade having two radially extending slots therethrough, said slots being positioned in a plane perpendicular to the axis of said shaft and being positioned in spaced relationship to each other, said shaft being positioned therebetween, a sleeve rotatably mounted on said shaft, said shaft having a groove on the surface thereof, said sleeve having a slot therethrough positioned facing said groove and in angular relation thereto, a second blade fixedly connected to said sleeve for rotation therewith, said second blade having a curved slot therethrough, a third blade rotatably mounted on said shaft, said third blade being positioned between said first and second blades, said third blade having first and second curved slots therethrough, a fourth blade movably mounted on said shaft, said fourth blade having an elongated slot, said shaft being positioned in said elongated slot, whereby the fourth blade is radially displaceable on said shaft along a plane perpendicular to the vertical axis of said shaft, said fourth blade being diametrically opposite to said first blade and being positioned between said first blade and said third blade, said fourth blade having two spaced stud members positioned on the surface thereof facing said third blade, one of said stud members projecting through said first curved slot in said third blade and through said curved slot in said second blade and the other of said stud members projecting through said second curved slot in said third blade, said fourth blade having two spaced stud members positioned on the surface thereof facing said first blade, one of said stud members projecting through said one of said radially extending slots in said first blade and the other of said stud members projecting through said other of said radially extending slots in said first blade, manual control means for rotating said sleeve relative to said shaft, said control means being positioned about said sleeve and operatively connected thereto, said control means including an axially movable collar having a pin connected thereto, said pin projecting through said slot in said sleeve and slidably engaging said groove in said shaft, whereby there are simultaneously displaced said fourth blade radially and said third blade angularly relative to said shaft when said shaft and said sleeve are rotated relative to each other and whereby the second, third, and fourth blades are displaced relative to the first blade in such a way as to occupy three given positions with respect to the first blade each for the purpose of obtaining, as desired, two, three or four occultations for each rotation of the shutter under the action of said manual control means, either while the projector is in operation or while it is at rest.

References Cited in the file of this patent

UNITED STATES PATENTS

| | | |
|---|---|---|
| 1,417,005 | Wescott | May 23, 1922 |
| 1,464,472 | Gibbs et al. | Aug. 7, 1923 |
| 1,873,742 | Debrie | Aug. 23, 1932 |
| 2,349,500 | Howell | May 23, 1944 |
| 2,609,725 | Isom et al. | Sept. 9, 1952 |